United States Patent [19]
Tums et al.

[11] 3,865,954
[45] Feb. 11, 1975

[54] CLOSURE FOR SHIRRED CASING STICKS

[75] Inventors: Valdis M. Tums, Palos Park;
Thomas J. Maxwell, Lockport, both of Ill.

[73] Assignee: Union Carbide Corporation, New York, N.Y.

[22] Filed: Apr. 11, 1972

[21] Appl. No.: 242,932

[52] U.S. Cl............... 426/140, 138/118.1, 426/138
[51] Int. Cl............................................. A22c 13/00
[58] Field of Search............ 99/175, 176; 17/11, 33, 17/34, 42, 49, 45; 426/140, 177, 105, 135, 138; 138/118.1

[56] References Cited
UNITED STATES PATENTS
3,274,005  9/1966  Alsys..................................... 99/176
3,419,401  12/1968 Matecki................................. 99/176

*Primary Examiner*—Hyman Lord
*Attorney, Agent, or Firm*—Franklyn Schoenberg

[57] ABSTRACT

A hollow shirred casing stick is provided having the terminal pleats of one end thereof twisted into a funnel-like configuration at least a portion of which is implanted within said hollow stick to form an end closure. An end closure may be formed in a shirred casing stick by twisting the terminal pleats of a shirred casing stick into said stick about a rod member inserted therein. A device is also provided for forming an end closure in a hollow shirred casing stick comprising in combination a rod member; means for inserting said rod member in a hollow shirred casing stick; a rotatable, twisting member having means for engaging and twisting the terminal pleats of a hollow shirred casing stick about said inserted rod member; means for rotating said rotatable twisting member; and means for retracting said rod member from within an end closure formed thereabout within a shirred casing stick without disturbing the end closure formed.

4 Claims, 7 Drawing Figures

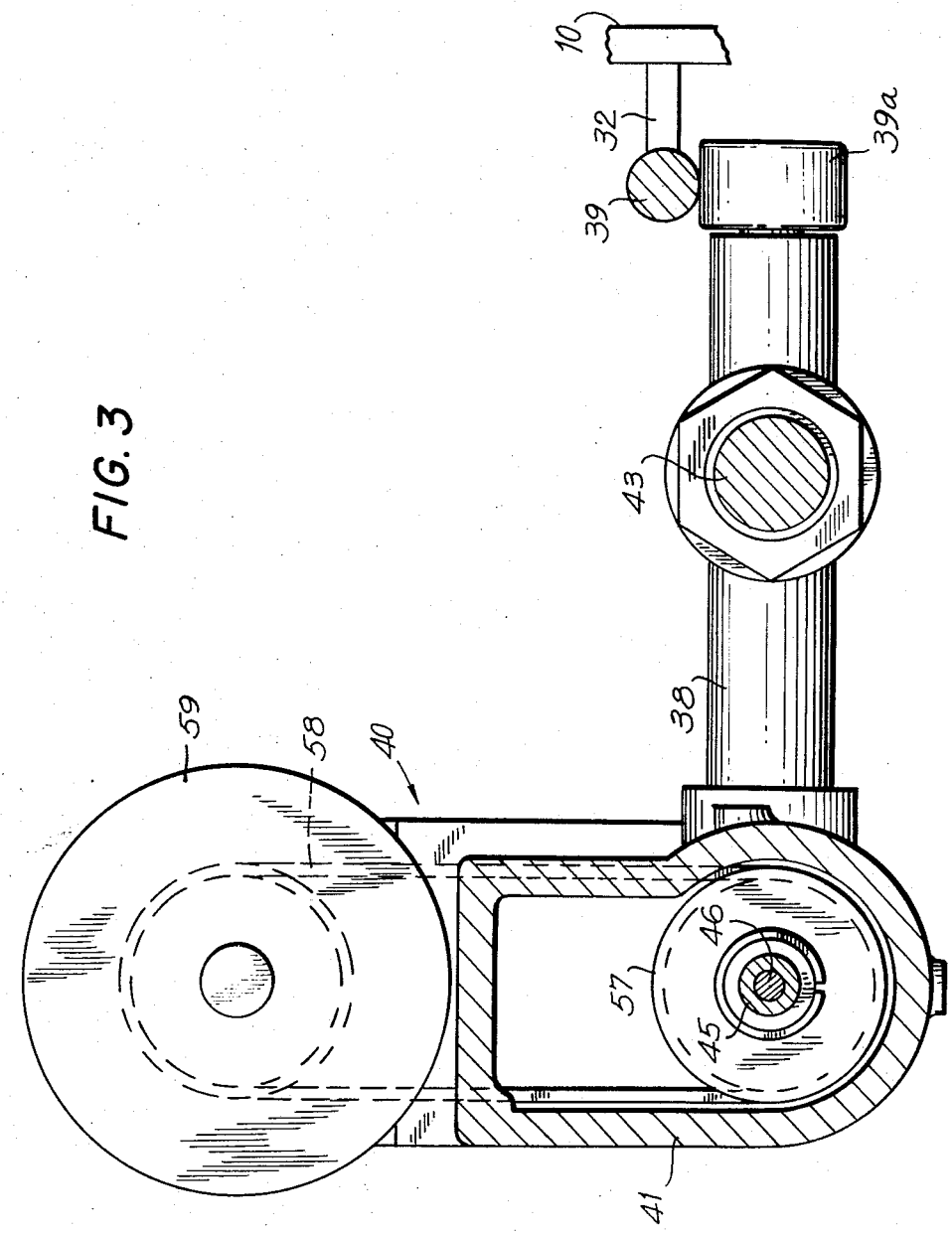

CLOSURE FOR SHIRRED CASING STICKS

This invention relates to an improved shirred stick of tubular food casing and more particularly to a shirred stick of tubular food casing having an end closure, and to a method and apparatus for making the same.

Man-made tubular food casings, particularly food casing prepared of regenerated cellulose, are used extensively in the manufacture of sausage products such as skinless frankfurters and the like. In general, these casings are prepared as hollow, thin-walled tubes of very great length. In practice, tubular casings of lengths ranging from about 40 to 160 feet or more are shirred and compressed to produce what is commonly termed in the art "shirred casing sticks or strands" of from about 8 inches to 27 inches in length.

After shirred casing sticks are prepared, they are packaged and shipped to a food processor where individual sticks of casing are placed on stuffing horns and stuffed with food emulsion filling the casing to its fully extended length. Such casing sticks may be stuffed by manual or automatic operation.

Automated machines have been developed for the stuffing and/or stuffing and linking of shirred food casings with meat emulsion in the making of frankfurters, and the use of these machines, as, for example, disclosed in Townsend U.S. Pat. No. 3,115,668, has greatly increased the production rate of sausage product.

Heretofore, when the food casing was stuffed manually, the operator would deshirr a short length of casing from the end thereof and effect a closure to prevent the meat emulsion extruded into the shirred casing from being lost from the open end thereof. In the automated stuffing machines, the shirred casing sticks are fed automatically and rapidly onto the stuffing horn and it is required that the fore end of the casing stick have a plug or closure so as to effectively block the flow of food emulsion therefrom. Providing a casing having an end plug or closure formed therein generally can be more uniformly and economically accomplished during casing manufacture than during use of the casing. Various types of casing closures and methods for forming the same are known and have been disclosed, for example, in U.S. Pat. Nos. 3,162,893 to Townsend, 3,274,005 to Alsys, 3,383,222 to Alsys et al., and 3,419,401 to Matecki.

These heretofore known casing end closures, while exhibiting many advantages over the manually formed closures, have, however, been found to have certain limitations as, for example, not being readily formable on the shirring machine, or being difficult to control the amount of casing used in forming the end closure, or being too rigid to be employed conveniently in some versions of automatic stuffing machines.

In accordance with the present invention, there is provided a hollow shirred casing stick having the terminal pleats of one end thereof twisted into a funnel-like knot configuration, at least a portion of which is implanted within said hollow shirred stick to form an end closure thereofor. The end closure in said shirred casing stick will, in general, be suitable to restrain the passage of food emulsion in a manner required for use on automatic stuffing machines yet will enable an emulsion to be readily stripped from the end thereof. The end closure of the present invention may be formed from an essentially predetermined amount of tubular casing, and may be pervious to the passage of air or other gases if so desired.

Also provided are a method and apparatus for forming an end closure at least a portion of which is implanted within a hollow shirred casing stick. The method, in general, comprises inserting a rod or forming member, preferably a non-rotatable rod member, into one end of a shirred casing stick without engaging any portion of said casing stick, progressively twisting terminal pleats from the end of the shirred casing stick, through which said rod member is inserted, into the casing stick and about said rod member until a close-packed knot of casing is formed about said rod member; and then withdrawing said rod member from within the close-packed knot of casing without disturbing the closure formed thereby. In alternate embodiments of the present invention, the close-packed knot of casing may be expanded or broached within said casing stick or advanced further into said casing stick, preferably just before or as said rod member is being withdrawn from within the knot of casing. Advantageously, the hollow shirred casing stick having an end closure in accordance with the present invention may be prepared either on the shirring machine used to form a shirred casing stick or the end closure may be formed on apparatus separate from a shirring machine.

Moreover, the casing end closure device of the present invention, as will be apparent from the embodiments hereinafter described, may be employed in conjunction with any of the shirring machines well known in the art or completely separate therefrom.

The terms "fore end" and "aft end" of the shirred casing stick are used herein to indicate the direction of shirring in the stick, the fore end being the first part of the casing to be shirred, and the aft end being the last part of the casing to be shirred.

The casing end closure device of the present invention comprises in combination: a rod member; means for inserting said rod member into the bore of a shirred casing stick; a rotatable, twisting member having means for engaging and twisting the terminal pleats of a shirred casing stick relative to the rest of the shirred casing stick into the shirred casing stick and about said inserted rod member; means for rotating said rotatable twisting member; means for urging said rotating twisting member into engagement with the terminal pleats of a shirred casing stick; and means for retracting said rod member from within an end closure formed therestabout within a shirred casing stick.

In one embodiment of the apparatus of the present invention as, for example, the embodiment shown in the Figures, the casing end closure device is movably mounted on the frame of a shirring machine adjacent the doffing end of the shirring machine mandrel and means are provided for advancing and retracting said casing end closure device into and out of the aligned engagement with a shirred casing stick extending somewhat beyond the end of said mandrel. Tubing such as cellulosic tubular food casing is shirred and compressed on the mandred of one of the conventional shirring machines well known in the art. Typical methods and apparatus employed to shirr lengths of tubular casing to obtain shirred casing sticks are disclosed, for example, in U.S. Pat. Nos. 2,983,949 and 2,984,574 to Matecki and 3,110,058 to Marbach.

A typical shirring machine comprises mandrel means; shirring means about a portion of said mandrel means; means for inflating and advancing measured lengths of inflated continuous tubular casing about said mandrel means and through said shirring passage means; means for compressing compacted, pleated casing advancing from said shirring passage means into a shirred casing stick; and means for doffing said shirred casing stick from said mandrel means. Shirring machines particularly suitable for use in accordance with the practice of the present invention will include means for positioning and restraining a compressed shirred casing stick with a portion of the fore end thereof extending somewhat beyond the doffing end of the mandrel means.

The advancing and retracting means provided for the casing end closure device on the shirring machine frame advances said closure device so that the fore end thereof is in aligned engagement with the fore end of a shirred casing stick extending beyond the end of mandrel means of the shirring machine.

Alternatively, suitable embodiments of the present invention may include means for advancing and retracting the end of a shirred casing stick into and out of aligned engagement with the casing end closure device of the present invention.

Shirred casing sticks prepared using methods and apparatus well known in the art are suitable for use in accordance with the practice of the present invention to prepare the shirred casing stick of the present invention.

In an embodiment of the method of the present invention, a severed predetermined length of shirred and compacted casing is advanced along the shirring mandrel to a mandrel clamp where the length of shirred casing is axially compressed against the mandrel clamp. When final compression of the shirred casing stick has been accomplished, the mandrel clamp is opened and the shirred stick is advanced until the fore end thereof extends somewhat beyond the end of the shirring mandrel.

A casing end closure device is advanced into aligned engagement with the portion of the fore end of the casing stick extending somewhat beyond the end of the shirring mandrel. A rod member, preferably nonrotatable, extending outwardly from said end closure device is inserted into the bore of the fore end of the casing stick without engaging any portion of said casing stick. A rotating-twisting member engages the terminal pleats of the fore end of the casing stick and twists said terminal pleats into the casing stick about said inserted rod member until a close-packed knot of casing is formed about said rod member. Said rod member is then withdrawn from within the close-packed knot of casing without disturbing the closure formed thereby and the casing end closure device is retracted from engagement with the fore end of the casing stick.

The foregoing and other features of the invention set out in the appended claims are incorporated in the method and apparatus of manufacture and in the article, certain illustrative embodiments of which are now to be described with reference to the accompanying drawing in which:

FIG. 3 is a sectional end elevation of the casing end closure device taken along lines 3—3 of FIG. 2.

Figure 1:
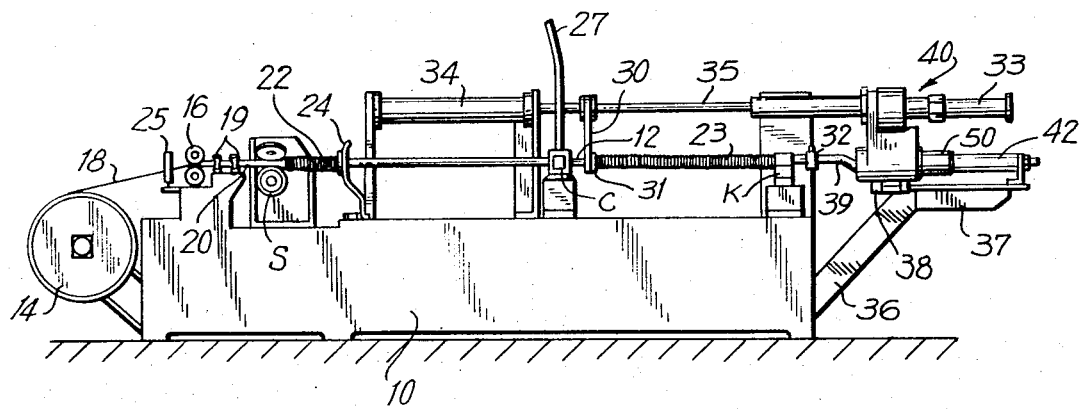
FIG. 1 is a diagrammatic side elevation view of a shirring apparatus showing one embodiment of the casing end closure device of the present invention in its retracted or inoperative position.

Turning now to the drawing, wherein like reference numerals denote like parts, there is shown in FIG. 1, a diagrammatic side elevation view of a shirring apparatus which incorporates one embodiment of the casing end closing device of the present invention. The flattened tubing, such as cellulosic tubular food casing, 18 to be shirred is supplied in roll form 14.

Vertical guide rolls 25, metering rolls 16 and tubing alignment rolls 19 advance the tubular casing from supply reel 14 to hollow mandrel 12 and through shirring zone S. There are many methods and apparatus known for shirring tubular casing to prepare shirring casing sticks. Exemplary apparatus and methods are described in U.S. Pat. Nos. 2,819,488, 2,984,574, 2,983,949, 3,097,393 and 3,110,058.

Shirring zone S and associated apparatus are mounted on support frame 10. Floating hollow mandrel 12 is supported in a horizontal attitude by clamps C and K, the leading end of said mandrel 12 being positioned between shirring zone S and alignment rolls 19. Gaseous inflation air is supplied to the interior bore of the mandrel 12 through clamp C which is connected to a compressed air supply hose 27. A holdback arm 24 is movably mounted on support frame 10, one end thereof engaging pleated casing 22 on mandrel 12 emerging from shirring zone S, and cooperatively retracting with pleated casing advancing from the shirring zone S at a rate that restrains and compacts the loosely shirred casing 22.

Independently acutated pneumatic cylinders 33 and 34 are mounted on frame 10 in tandem on a common axis with piston rod 35 extending from cylinder 34. Compressor arm 30 is rotatably secured on piston rod 35 and a pair of mandrel encircling jaws 31 are pivotally mounted on the outwardly extending end of compressor arm 30 to slideably engage mandrel 12 and abut the aft end of shirred casing stick 23.

A casing end closure device, shown generally as 40, is movably mounted on the bracket 36 and mounting plate 37 secured at the aft end of frame 10.

Figure 4:
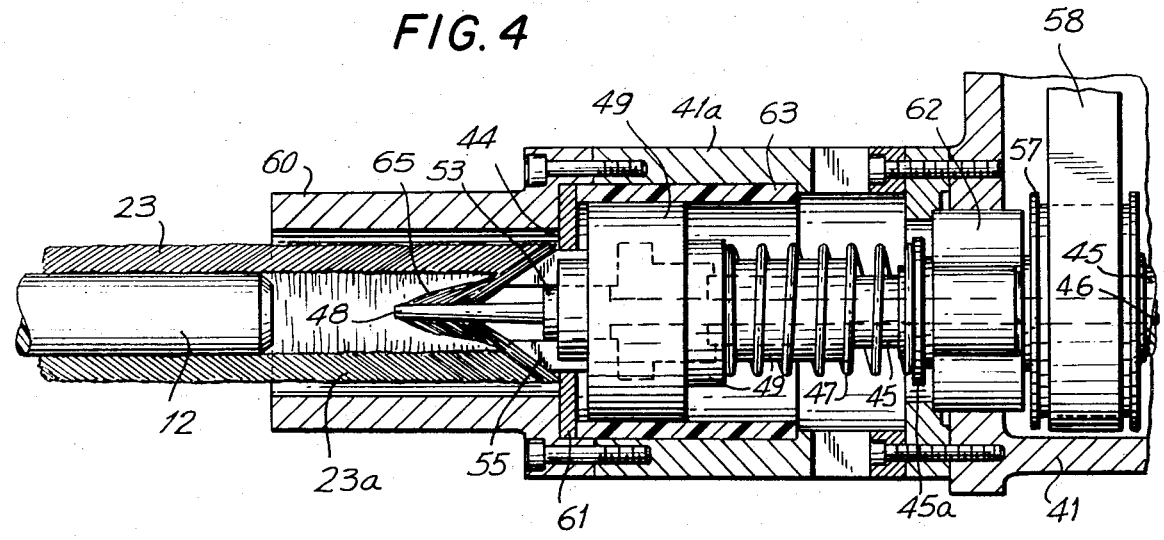
FIG. 4 is an enlarged sectional fragmentary side elevation view of the fore end of the casing end closure device of FIG. 2 shown in an advanced intermediate operative position engaging the fore end of a shirred casing stick while producing a casing closure.
Figure 2:
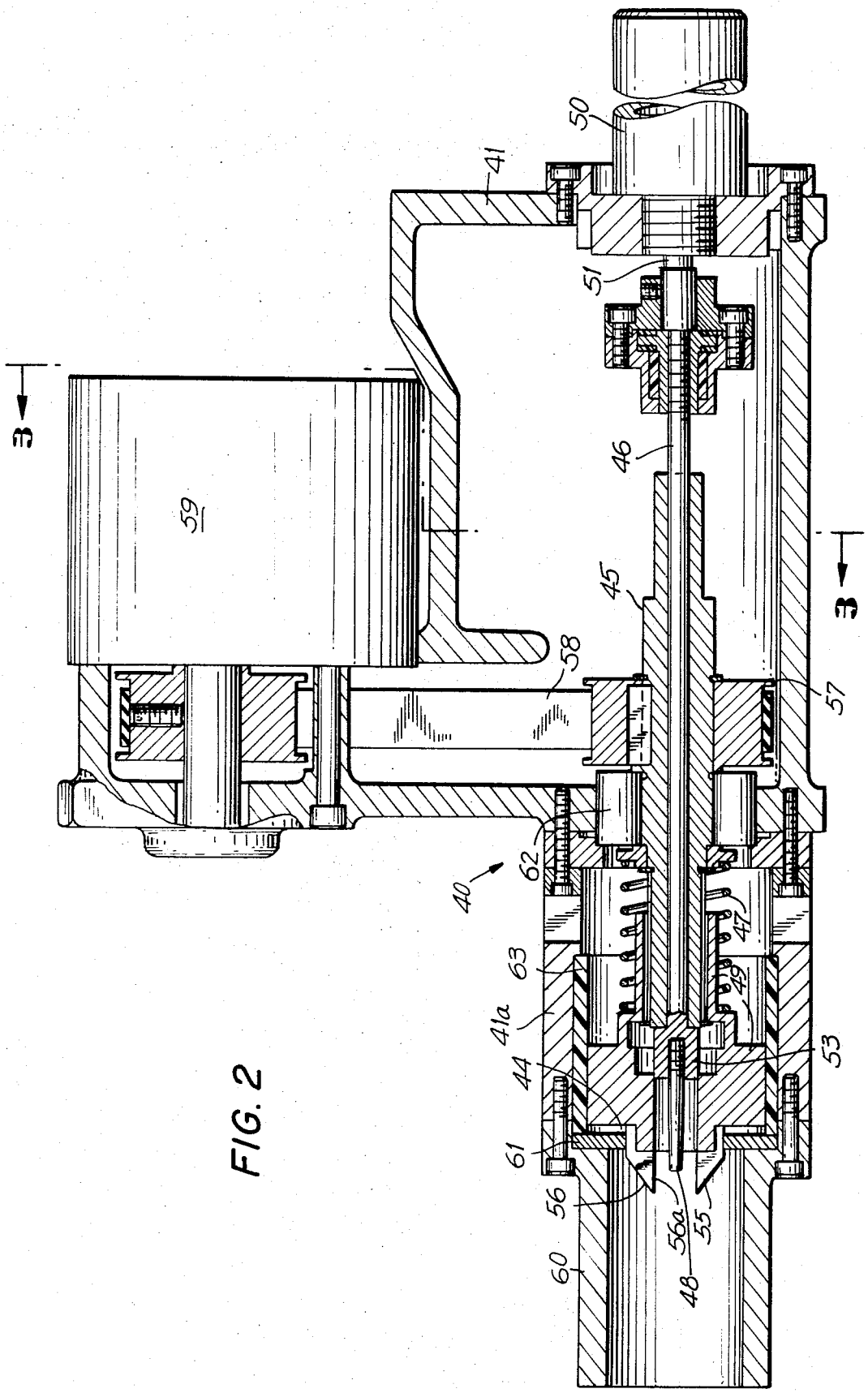
FIG. 2 is a sectional side elevation view of one embodiment of the casing end closure device of the present invention.

FIGS. 2, 3 and 4 illustrate a general assembly of one embodiment of the casing end closure device that incorporates the essential features of the present invention. The casing end closure device 40 comprises a housing 41 having a housing extension 41a secured to the front end thereof. A midportion of hollow shaft 45 is rotatably mounted in bearing 62 secured in housing 41. A fore portion of shaft 45 is splined and is encompassed by mating splined slide 49 that is slideably and rotatably mounted in bushing 63 secured in housing extension 41a. A spindle 46 is slideably mounted within hollow shaft 45. The aft end of said spindle 46 extends beyond the end of hollow shaft 45 into housing 41 and is secured to the end of piston rod 51 extending from the pneumatic cylinder 50 mounted on housing 41. The fore end of said spindle 46 having shoulder 53 secured thereto extends outwardly from the front end of housing extension 41a through the port 44.

Mounted on the outboard end of splined slide 49 and distributed uniformly thereabout are a plurality of wedge-shaped twisting plates 55. The plurality of plates 55 are mounted on splined slide 49 in spaced relationship, their oblique gripping surface 56 defining a hollow conical-shaped configuration. The number of twisting plates 55 and the included angle 56a between oblique gripping surface 56 and the axis of spindle 46 are not critical. Two or more plates having included angles 56a varying from about 20° to 75° are suitable, but assemblies with two plates, having an included angle 56a of between about 30° and 35°, have been most advantageously employed. The twisting plates 55 are mounted on slide 49 in spaced apart relationship to form a passage for the traversing of rod member 48 and shouldered end 53 of spindle 46 within hollow shaft 45 and splined slide 49.

Mounted on shaft 45 within housing 41 is a pulley 57 which is connected through drive belt 58 to drive motor 59. A compression spring 47 is sheathed about the outer diameter of the portion of shaft 45 within housing extension 41a and is interposed between shouldered washer 45a secured on shaft 45 and splined slide 49.

Centrally secured to shoulder 53 mounted on the free end of the spindle 46 and axially extending therefrom is an elongated rod or forming member 48. Said rod member 48 has a diameter smaller than that of shoulder 53 of spindle 46 and the internal diameter of shirred casing stick 23. Rod member 48 may be of uniform diameter over its length or it may be tapered. Preferably, rod member 48 is not rotatable but, if desired for certain applications, alternative embodiments that would be obvious to those skilled in the art may provide means for rotating said rod member 48. Exemplary of such means would be to rotatably secure spindle 46 with hollow rotating shaft 45 by means of a slide key.

Secured to the front end of housing extension 41a about port 44 and outwardly extending therefrom is casing guide 60. The internal diameter of guide 60 is somewhat larger than the outer diameter of shirred casing stick 23. Thus guide 60 can be freely advanced about or retracted from about the fore end of the casing stick 23 and guide 60 will not engage or restrain said casing stick 23. The casing guide 60 thereby serves to guide segment 23a of shirred casing stick 23 into alignment with port 44. Mounted on the outboard end of housing extension 41a is a stop ring 61 which arrests the advance of the closure device 40 upon engagement with the fore end of said casing stick 23a.

Referring now to FIGS. 1 and 3, the end closure device 40 is fastened to frame 10 by bracket 36 and mounting plate 37. Pneumatic cylinder 42 is fastened to mounting plate 37 to operate parallel to mandrel 12. A support crosshead 38 is rotatably secured at its midpoint to the outboard end of piston rod 43 of cylinder 43 with end closure assembly 40 in turn being secured to one end of support crosshead 38.

A stationary slide cam 39 is fastened at one end to frame 10 by bracket 32. Slide cam 39 is shaped in a helix to cooperate with cam follower 39a which is rotatably mounted on one end of crosshead 38, thus raising and lowering end closure device 40 into and out of axial alignment with mandrel 12 as piston rod 43 of cylinder 42 is advanced and retracted.

A typical operation of a preferred embodiment of the apparatus of the present invention will now be described and will be more readily understood when considered with FIGS. 1 to 4.

As may be seen from FIG. 1, in the operation of the shirring machine a supply of flattened tubing such as cellulosic tubular casing 18 is withdrawn from a supply reel 14 by a pair of metering rolls 16 through a pair of guide rolls 25. The flattened tubing 18 is expanded into inflated tubing 20 by gaseous means and then by means of a plurality of pairs of rolls 19 the inflated tubing 20 is aligned centrally onto hollow mandrel 12 and advanced through shirring zone S where it is shirred.

Hollow mandrel 12 is supported by the first clamp C and second clamp K with the leading end of the mandrel 12 positioned between the shirring zone S and the tubing alignment rolls 19. Gaseous inflating means is supplied to said mandrel 12 through clamp C connected to any convenient source by hose 27, the leading end of mandrel 12 then supplying said inflating gas to casing 20.

The shirred casing 22 advancing from the shirring zone S is engaged by holdback 24 which cooperatively retracts with casing 22 at a rate that restrains and compacts said casing 22. When a predetermined length of casing, as, for example, about 160 feet, is shirred and compacted on the mandrel 12, the compacted shirred casing 22 is severed from the following length of shirred casing at a position adjacent the shirring zone S. First clamp C is opened and the resulting severed length of casing 23 is advanced along mandrel 12 until its fore end abuts closed clamp K.

Compressor arm jaws 31 pivotally mounted on compressor arm 30, which is rotatably secured on piston rod 35, slideably engages mandrel 12 and abuts the aft end of severed casing 23. Jaws 31 may be adapted to restrain or assist in restraining a shirred length of casing 23 from rotating about mandrel 12.

Cylinder 34 is actuated advancing piston rod 35 and compressor arm 30 toward second clamp K thereby compressing casing 23 between jaws 31 of compressor arm 30 and clamp K. The stroke of piston rod 35 is arrested at a predetermined position by abutment with the end of fully advanced piston rod (not shown) of cylinder 33. Cylinder 33 is actuated to exert a force great enough to arrest piston rod 35 at a predetermined position and thereby critically controls the advance of compressor arm 30 to obtain a desired compressed casing length. When the desired compressed length of casing stick 23 has been attained as, for example, about 19 inches, the compression cycle is terminated, clamp K is opened and the air in cylinder 33 is released, retracting its piston rod. cylinder 34 which remains pressurized advances piston rod 35 and compressor arm 30 thereby advancing casing stick 23 along mandrel 12 until a short length 23a, for example, about 1½ inches to 2 inches, of the fore end of said casing stick 23 extends beyond the end of mandrel 12 in which position casing stick is restrained by jaws 31 of compressor arm 30. Cylinder 42 is then actuated and casing end closure device 40 is advanced into aligned engagement with the fore end of said casing segment 23a.

Casing guide 60 extending outwardly from the fore end of housing extension 41a of said end closure device 40 serves to guide the alignment of the advancing end of closure device 40 and the fore end of the casing segment 23a, said closure device 40 being advanced until ring 61 mounted on the fore end thereof abuts casing segment 23a. The oblique surfaces 56 of twisting plates 55 engage the terminal pleats of the fore end of the casing segment 23a, a portion of said plates 55 extending somewhat into the bore of said casing segment 23a. Compression spring 47 is adapted to be compressed somewhat as, for example, about one-eighth inch when plates 55 engage the terminal pleats of casing segment 23a, to thereby apply an initial force of about 3 pounds to said plates 55 urging them into continuous engagement with the terminal pleats of casing segment 23a.

Alternatively, it will be obvious to those skilled in the art that the fore end of a shirred casing stick may be advanced into engagement with an end closure device of the present invention positioned in adjacent alignment with casing stick support means by any number of suitable means as, for example, the compressor arm 30 mounted on piston rod 35.

Pneumatic cylinder 50 is then actuated and spindle 46 is advanced until rod member 48 is inserted centrally into the bore of casing segment 23a. Then, drive motor 59 is actuated, and rotation of hollow shaft 45 and twisting plates 55 is initiated by drive belt 58.

The twisting plates 55 mounted on splined slide 49 are urged under substantially constant pressure against the fore end of casing segment 23a by compression spring 47, biased between shoulder 45a and splined slide 49. Rod member 48 is secured to shoulder 53 of spindle 46 which in turn is restrained from rotation by connection to a preselected non-rotating piston construction in air cylinder 50. Engagement of twisting plates 55 with the fore end of casing segment 23a while casing stick 23 is restrained from rotating, progressively deshirrs the terminal pleats of casing segment 23a and twists them into the casing about non-rotating rod member 48 forming a close-packed knot of casing about said rod member 48. When twisting plates 55 have made a prescribed number of revolutions, for example, about 4 to 8 revolutions and preferably about 5 to 7 revolutions, drive motor 59 and thereby the rotation of twisting plates 55 is stopped. Cylinder 50 is then actuated and spindle 46 is retracted withdrawing rod member 48 from within the close-packed knot of casing without disturbing the twist closure formed thereabout.

Alternatively, it has been found advantageous for certain types of casing or certain applications to implant or anchor the close-packed knot of casing of the closure more securely into the fore end of the casing stick. The closure can be thus more firmly secured in the bore of the casing by the further step of applying a predetermined axial displacement and expanding or broaching force on the close-packed knot of casing. If, for example, a broached closure is desired, when rotation of the twist blades 55 is stopped, cylinder 50 is advanced to urge spindle 46 and shoulder 53 into the casing stick, as, for example, about one-fourth inch to three-eighths inch, thereby inserting, expanding or broaching the close-packed knot of casing further into the bore of casing stick 23. When the desired degree of anchoring or implanting of the closure has been obtained, spindle 46 is then retracted and rod member 48 is withdrawn from within the inserted, implanted closure.

After the rod member 48 has been completely withdrawn from the casing closure, pneumatic cylinder 42 is actuated and end closing device 40 is retracted from the fore end of casing segment 23a and the casing stick 23 is ready to be doffed or stripped from the end of the mandrel 12.

The end closure formed in a hollow shirred casing stick in accordance with the practice of the present invention may, in general, be readily formed in any hollow shirred casing stick prepared from tubular casing of varying diameter and wall thickness on any of the shirring machines well known in the art. Moreover, it will be obvious to those skilled in the art that end closures formed in hollow shirred casing sticks in accordance with the practice of the present invention may be readily formed in shirred casing sticks mounted or supported on a shirred mandrel or by any other suitable support means totally separate from a shirring machine, as, for example, an internal mandrel, an external sleeve and the like.

Figure 5A:
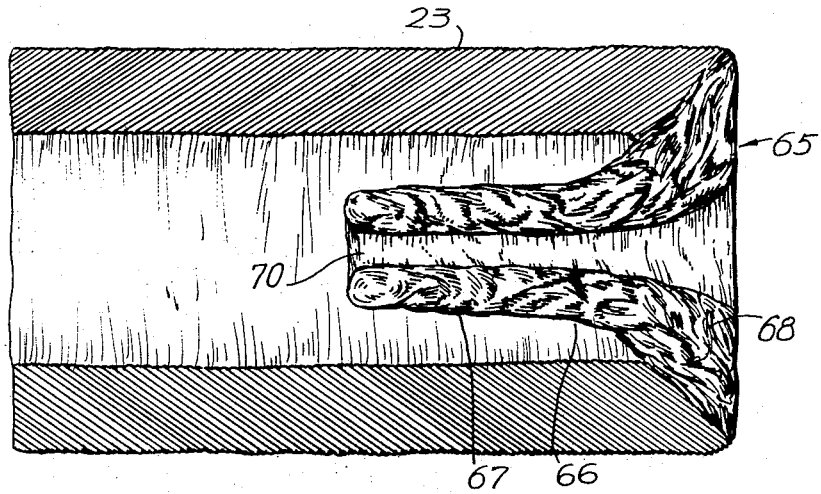
FIG. 5a is an enlarged sectional view of a casing end closure implanted within the end of a portion of a shirred casing stick.
Figure 5B:
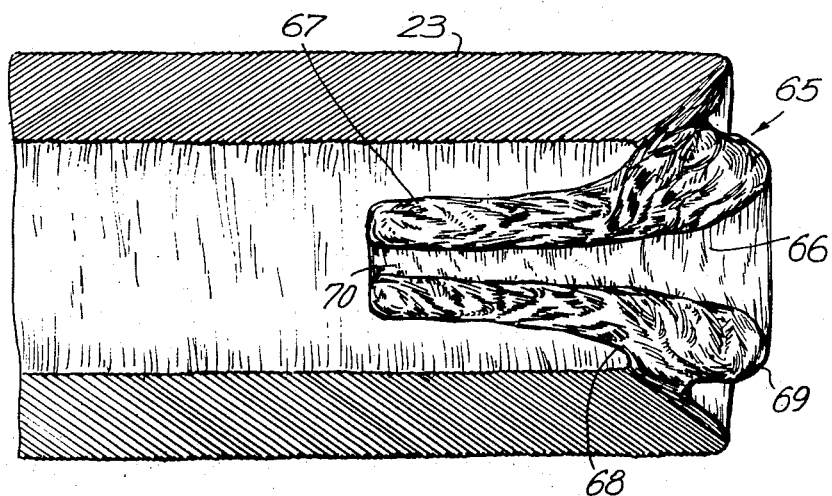
FIG. 5b is an enlarged sectional view of the end of a portion of a casing stick having at least a portion of a casing end closure implanted therein.
Figure 5C:
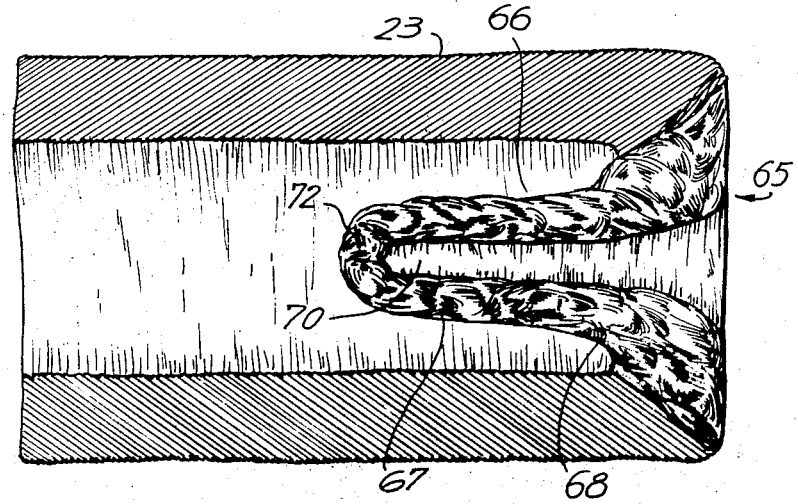
FIG. 5c is an enlarged sectional view of a casing end closure not pervious to the passage of air or gases implanted within the end of a portion of a casing stick.

After the end closure device 40 is withdrawn, the shirred casing stick 23, with an end closure formed therein, shown generally as 65, has, in general, the configurations shown in any of FIGS. 5a, 5b and 5c wherein are illustrated enlarged sectional views of the fore end of a shirred casing stick 23 with various embodiments of the end closure implanted therein.

The end closure of the present invention has been found to exhibit a funnel-like knot configuration 66 wherein terminal pleats of the shirred stick first twisted into the casing stick about rod member 48 inserted therein are formed into a generally cylindrical-like knot configuration 67 and terminal pleats last twisted into the casing stick are formed in a generally conical-like knot configuration 68. The end closure 65 may be implanted entirely within the shirred casing stick 23 as illustrated in FIGS. 5a and 5c or a portion of the closure 69 may extend beyond the fore end of the shirred casing stick 23 as shown in FIG. 5b. The end closures illustrated in FIGS. 5a and 5b are pervious to the passage of air or various gases. A passage 70 extends through the end closure 65 which will permit the passage of gases therethrough but will restrain the passage of food emulsion. In FIG. 5c there is illustrated a sectional view of the fore end of a shirred casing stick 23 having an end closure 65 implanted entirely within said stick 23 which is impervious to the passage of air or gases, a passage 70 having a blind end 72 extending through only a portion of the end closure 65.

It is essential to the practice of the present invention that a rod member be inserted into the bore of the shirred casing stick and that the terminal pleats of the casing stick are twisted about said inserted rod member in the forming of the end closure. The length of said rod member in general can be varied depending on whether a pervious or impervious end closure is desired. For example, when a pervious end closure is desired, a rod longer than the greatest length of the closure to be formed provides a clear passage 70. When an impervious end closure is desired, a rod member shorter than the length of the closure to be formed permits the terminal pleats first twisted into the stick to close upon each other thus providing a passage 70 having a blind end 72. The diameter of the rod or forming member is not critical, generally, depending on the diameter of the shirred casing stick within which the end closure is to be formed and also on the diameter of the passage to be formed through the end closure when a pervious end closure is desired. The diameter of the rod member may be generally varied within the limits that it must be small enough to be freely inserted into the bore of the shirred casing stick without engaging any portion of the internal diameter thereof and should be large enough so that it is essentially rigid and will not be damaged as the casing material is twisted thereabout. In a preferred embodiment, the rod member is tapered for ease of withdrawal from the implanted closure.

It has been found that the end closure device of the present invention produces an end closure having at least a major portion thereof implanted within the shirred casing stick. A number of factors may affect the proportion of end closure implanted within the shirred casing stick, as, for example, the diameter of the tubular inflated casing, the wall thickness of the tubular casing, the moisture content of the shirred casing stick, or the force applied in engaging the rotating-twisting member with the terminal pleats of the fore end of the shirred casing stick. As pointed out hereinabove, when so desired, the end closure 65 may be more firmly secured within the shirred casing stick 23 by advancing shoulder 53 of spindle 46 (FIGS. 2 and 4) against the closure formed, thereby providing an expanding or broaching force on the close-packed knot of casing implanted in the fore end of the shirred casing stick prior to removing rod member 48 from within the closure 65.

The shirred casing stick of the present invention exhibits a combination of desirable features that enhance its suitability for use in conjunction with automatic food stuffing apparatus. The end closure may, in general, be consistently formed from a relatively short length of tubular casing material, for example, a casing length generally equivalent to between about 10 to 20 times and preferably between 12 to 18 times the inflated casing diameter; the end closure may be made so as to be pervious to the passage of air or gases while restraining the passage of food emulsion; the end closure maintains its integrity during the multiplicity of operations common to the treatment, handling, shipping and stuffing of shirred casing in addition to restraining the passage of food emulsion therefrom; and a substantial portion of the casing in the closure will be extended after the initial injection of food emulsion has been restrained, thereby enabling the emulsion in the initial segment of stuffed casing to be readily stripped therefrom.

Tubular material suitable for use in the shirred casing stick of the present invention may be any shirrable natural or synthetic tubular material such as tubular films of amylose, starch, polyvinyl alcohol, alginates, cellulose derivatives, gelatin, collagen, casein or plastic films including polystyrene, polyvinyl chloride, polyethylene, polypropylene and the like, and preferably a tubular regenerated cellulose casing of the type used in the preparation of sausages.

Tubular films of varying diameters and wall thicknesses may be employed and particularly those sizes especially useful in connection with food casing typically ranging in diameter from about nine-sixteenths inch to about 1¼ inches and having wall thicknesses of from about 0.0006 inch or less to about 0.003 inch or more.

It is to be understood that other modifications and changes to the preferred embodiments of the invention herein shown and described can also be made by a person skilled in the art without departing from the spirit and scope of the invention.

What is claimed is:

1. A hollow shirred food casing stick having casing material from one end thereof progressively twisted into a close-packed funnel-shaped knot configuration about a passage through at least a portion thereof and at least a portion of said twisted casing being implanted within said hollow stick to form an end closure therefor, the funnel shaped configuration of said end closure comprising a first portion of casing material from the end of said stick being progressively twisted into a generally cylindrically shaped knot configuration that is totally within said hollow stick and a second portion of casing material from the end of said casing stick and continuous therewith being progressively twisted into a generally conically shaped knot configuration.

2. The shirred casing stick of claim 1 in which said end closure is pervious to the passage of gas therethrough.

3. The shirred casing stick of claim 1 in which said end closure contains a length of casing material equivalent to between about 10 to 20 times the diameter of the inflated casing.

4. The shirred casing stick of claim 1 in which said end closure is implanted totally within said hollow stick.

* * * * *